Patented Oct. 31, 1950

2,527,970

UNITED STATES PATENT OFFICE 2,527,970

HYDROXY ETHERS AND PROCESS FOR PRODUCTION THEREOF

Herman Sokol, Hasbrouck Heights, N. J., assignor to Heyden Chemical Corporation, New York, N. Y., a corporation of Delaware No Drawing. Application June 18, 1945,
Serial No. 600,219

7 Claims. (Cl. 260—615)

The present invention relates to the production of hydroxy ethers or ether-alcohols, and more specifically to the production of ethers by the reaction of alkene epoxides (alkene oxides) and aliphatic polyhydroxy compounds. In one of its more specific aspects, the invention relates to a process for the production of hydroxy ethers having high molecular weights by the reaction of propylene oxide or a similar alkene oxide and pentaerythritol or a polypentaerythritol in the presence of an alkaline catalyst to produce ethers in which more than one alkene oxide molecule is reacted with each original hydroxyl radical of the pentaerythritol or polypentaerythritol. The invention also relates, in another of its more specific embodiments, to the novel hydroxy ethers thus produced.

Hydroxy ethers have been produced heretofore by the reaction of alkene oxides and aliphatic hydroxy compounds. The reaction may be conducted without a catalyst (see M. Wittwer, U. S. Patent No. 1,976,677). However, various different catalysts, including boric and sulfuric acids (O. Schmidt and E. Meyer, U. S. Patent No. 1,922,459 and British Patent No. 317,770), alkali-metal alcoholates, alkali-metal salts of lower fatty acids, normal sulfates of polyvalent metals, dialkyl sulfates, hydrosilicates, tertiary amines, pyridine, certain metal oxides, and stannic halides, antimony pentahalides, aluminum halides, zinc halides, ferric halides, and other metal halides (K. E. Marple, E. C. Shokal and T. W. Evans, U. S. Patent No. 2,327,053), have been suggested for facilitating the reactions. Other specific catalysts for the reactions, which are disclosed in the copending applications of Philip I. Bowman, Robert H. Barth and Harry Burrell, Serial No. 474,328, filed February 1, 1943, which has issued as Patent No. 2,401,743, and Serial No. 545,888, filed July 20, 1944, now abandoned, are acetic acid, acetic anhydride, pentaerythritol diacetate, pentaerythritol tetraacetate, benzoyl chloride and the double compound of boron fluoride and ethyl ether. When the reaction of an alkene oxide and pentaerythritol is conducted in the absence of a catalyst or in the presence of such catalysts as have heretofore been specified, the products are generally the expected hydroxy ether and varying proportions of polymers of the alkene oxide. Generally not more than one alkene oxide molecule reacts with each hydroxyl radical of the pentaerythritol. In the case of ethylene oxide and pentaerythritol the reaction may be represented as:

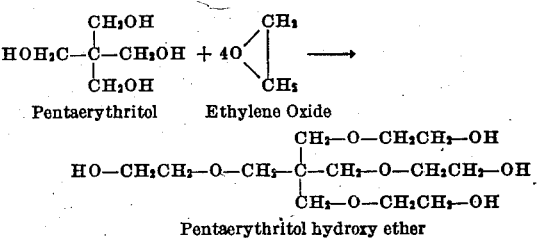

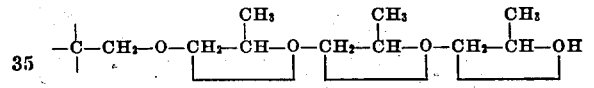

Pentaerythritol hydroxy ether

When certain catalysts are used the product is a mixture of the expected pentaerythritol hydroxy ether and varying amounts of polymers of ethylene oxide. From the hydroxyl content of such a mixture it might be concluded that more than one ethylene oxide molecule had reacted with each of the original hydroxyl radicals of the pentaerythritol. For example, in the case of a reaction in which a quantity equivalent to 3 molecules of propylene oxide was unrecovered for each original hydroxyl radical of the pentaerythritol, the hydroxy ether might be expected to be as represented by the following schematic formula, in which all four of the original methylol radicals of the pentaerythritol have been replaced by the represented hydroxy ether radical that is attached to the central or nuclear pentaerythritol carbon atom:

$$-\underset{|}{C}-CH_2-O-CH_2-\underset{|}{\overset{CH_3}{C}H}-O-CH_2-\underset{|}{\overset{CH_3}{C}H}-O-CH_2-\underset{|}{\overset{CH_3}{C}H}-OH$$

(The molecular weight of such a compound is approximately 830.) However, the molecular weight of the mixed product is much lower than would correspond to such a compound. As far as known, such pentaerythritol and polypentaerythritol hydroxy ethers having molecular weights corresponding to compounds in which two or more alkene oxide molecules have reacted with each original hydroxyl radical of pentaerythritol or a polypentaerythritol are not known and cannot be produced by processes heretofore known or described in the art.

The principal object of the present invention is to provide a process for the production of hydroxy ethers having high molecular weights which are products of the reaction of an alkene oxide and a polyhydric alcohol in which at least 2 molecules of alkene oxide are reacted with each of the original hydroxyl radicals of the polyhydric alcohol. It is a further more specific object of the invention to provide a process for the production of such hydroxy ethers of pentaerythritol and polypentaerythritols.

A further object of the present invention is to provide compounds having high molecular weights which are reaction products of pentaerythritol and polypentaerythritols and alkene oxides in which at least 2 molecules of alkene oxide are reacted with each of the original hydroxyl radicals of the pentaerythritol or polypentaerythritol.

Other objects and advantages of the invention, some of which are referred to more specifically hereinafter, will be apparent to those skilled in the art to which the invention pertains.

As used in this specification, the term "polypentaerythritol" is to be understood to include dipentaerythritol, tripentaerythritol and mixtures thereof, such as "pleopentaerythritol" (a mixture of dipentaerythritol and tripentaerythritol having a melting range of 230° to 240° C. and a hydroxyl content of approximately 33%).

I have discovered that propylene oxide and similar alkene oxides may be reacted with polyhydric alcohols such as pentaerythritol and polypentaerythritols to produce compounds corresponding to a reaction of at least 2 molecules of alkene oxide with each original hydroxyl radical of the polyhydric alcohol. In order to effect such a reaction it is necessary to use a strongly alkaline-reacting catalyst such as sodium metal, sodium hydroxide, potassium hydroxide, sodium methoxide and similar compounds. Only a small proportion of catalyst is required. It is furthermore necessary to conduct the reaction under substantially anhydrous reaction conditions since I have found that small but significant amounts of water favor the polymerization of the alkene oxide and hinder or suppress the desired reaction of the alkene oxide with the polyhydric alcohol. Furthermore, it is necessary to use xylene or another inert organic solvent which dissolves both the alkene oxide and the desired hydroxy ethers but which does not dissolve substantial amounts of the pentaerythritol or polypentaerythritol. Such inert solvent is preferably one with a low vapor pressure and a low molecular weight. By use of such an inert solvent the reaction may be conducted at a lower pressure. The solvent is used in substantial amounts but need not be used in a greater than equimolecular amount based on the alkene oxide.

Hydroxy ethers of my invention and processes for their production are illustrated in the examples which follow hereinafter:

*Example 1.—Hydroxypropyl ether of dipentaerythritol (two propylene oxide per hydroxyl)*

Into a one-liter, high-pressure, rocker-type steel bomb were charged 50.8 grams (approximately 0.2 mol) of dipentaerythritol, 151 grams (approximately 2.6 mols) of propylene oxide and 276 grams (approximately 2.6 mols) of xylene. The reaction mixture contained less than 0.1% water by weight. Approximately 0.3 gram of sodium metal was added and the mixture was heated with agitation to a temperature of 175° C. during the course of approximately 4 hours. The pressure rose to 90 pounds per square inch and then gradually fell to 40 pounds per square inch. Continued heating produced no further decrease in pressure.

After cooling the bomb to room temperature, its contents were removed and subjected to distillation at reduced pressure to remove the xylene and unreacted propylene oxide. Distillation was continued until no further distillate was obtained at a residue temperature of 100° C. and at a pressure of 5 mm. of mercury. The residue was a clear, light-brown-colored oil which weighed 191 grams and had the following characteristics:

|  | Observed | Calculated |
| --- | --- | --- |
| Molecular weight | 923 | 950 |
| Hydroxyl value percent | 11.9 | 10.7 |
| Viscosity (25° C.) poises | 55 | |

In the "calculated" column hereinabove are entered the values for the respective characteristics of a compound corresponding to dipentaerythritol in which each of the six methylol (—CH$_2$OH) radicals has been replaced by the radical

—CH$_2$-O-CH$_2$CH(CH$_3$)-O-CH$_2$CHOH-CH$_3$

The calculated values referred to hereinafter in the other examples were computed in a similar manner.

*Polymerization of propylene oxide under identical reaction conditions*

In order to determine what happens to propylene oxide under the actual reaction conditions used in the foregoing examples when pentaerythritol or a polypentaerythritol are not present, the following results are typical of repeated experiments that check each other very closely:

A mixture of 145 grams (approximately 2.5 mols) of propylene oxide and 265 grams (approximately 2.5 mols) of xylene containing approximately 0.5% by weight of water was charged to a 1-liter, high-pressure, rocker-type bomb. Approximately 0.3 gram of sodium metal was added and the agitated mixture was heated slowly to a temperature of 175° C. during a period of approximately 4 hours. The pressure rose to 185 pounds per square inch and then dropped gradually to 100 pounds per square inch. Continued heating produced no further reduction of the pressure.

After cooling the bomb to room temperature, its contents were removed and subjected to distillation at reduced pressure to remove the xylene and unreacted propylene oxide. The distillation was continued until no further distillate was obtained at a temperature of 100° C. (in the residue) and at a pressure of 5 mm. of mercury. The due was a clear, light-brown-colored oil which weighed 120 grams and had the following characteristics:

Molecular weight _____ 522
Hydroxyl value _____per cent__ 5.1
Viscosity (25° C.) _____poise___ 0.65

In view of this result it is obvious that the products of Example 1 hereinbefore and of the examples hereinafter are not simply polymers of propylene oxide but are new chemical entities.

One mol (254 g.) of dipentaerythritol, 30 mols (1320 g.) of ethylene oxide and 2 grams of a catalyst were heated together in a steel autoclave to a temperature of 175° C. The heating was conducted in such manner that approximately 5 hours were required to reach 175° C. and the mixture was maintained thereafter at 175° C. for a period of approximately 8 hours. The reaction mixture was allowed to cool and the unconsumed ethylene oxide was distilled from the reaction mixture. The residue was weighed and analyzed.

In the following table are given the weights of the products obtained when different catalysts were used (in each case 2 grams of catalyst were used) and the hydroxyl contents and molecular weights of the resulting products. On the assumption that all of the unrecovered ethylene oxide reacted with the dipentaerythritol and not with itself to form polymers the theoretical molecular weight of the resulting assumed product in each case was calculated and such values are entered in the table for purposes of comparison. The weight of the product and the hydroxyl value of the product checked closely the composition of the assumed product. It is to be noted, however, that the observed molecular weights of the products did not check the theoretical molecular weights of the assumed products.

| No. | Catalyst | Weight of Product, in grams | Hydroxyl Content of Product, per cent by weight | Composition of Assumed Product; Ratio of Dipentaerythritol to Ethylene Oxide | Theoretical Molecular Weight of Assumed Product | Observed Molecular Weight of Actual Product |
|---|---|---|---|---|---|---|
| 1 | Boric oxide | 635 | 17.5 | 1:9 | 650 | 328 |
| 2 | Double compound of boron fluoride and ethyl ether (45% BF$_3$). | 760 | 15.1 | 1:12 | 782 | 291 |
| 3 | Benzoyl Chloride | 1,212 | 10 | 1:18 | 1,046 | 448 |
| 4 | Acetic anhydride | 1,442 | 8.3 | 1:24 | 1,310 | 573 |
| 5 | Pentaerythritol diacetate | 1,630 | 7.5 | 1:30 | 1,574 | 600 |

The calculated weight of hydroxy ether which should result from the reaction of 1 molecule of dipentaerythritol and 6 molecules of ethylene oxide (1 ethylene oxide molecule per hydroxyl radical of the dipentaerythritol) is approximately 518 and its hydroxyl content is 20.0%. It is evident that the products obtained in the foregoing reactions and which are listed in the table contain no substantial amounts of products corresponding to reaction products having more than 6 molecules of ethylene oxide per molecule of dipentaerythritol and, from the average molecular weights of the products, it is obvious that they contain substantial amounts of polymers of ethylene oxide.

*Example 2.—Hydroxypropyl ether of dipentaerythritol (four propylene oxide per hydroxyl)*

A charge consisting of 25.4 grams (approximately 0.1 mol) of dipentaerythritol, 145 grams (approximately 2.5 mols) of propylene oxide, 265 grams (approximately 2.5 mols) of xylene and 0.3 gram of sodium metal was reacted and treated as in Example 1. The maximum pressure developed during the reaction was 95 pounds per square inch.

The product obtained weighed 162 grams and was a clear, brown oil, which had the following characteristics:

|  | Observed | Calculated |
|---|---|---|
| Molecular weight | 1,527 | 1,646 |
| Hydroxyl value per cent | 7.9 | 6.2 |
| Viscosity (25° C.) poises | 18 |  |

*Example 3.—Hydroxyethyl ether of pentaerythritol (three ethylene oxide per hydroxyl)*

A charge consisting of 27.2 grams (approximately 0.2 mol) of pentaerythritol, 114.4 grams (approximately 2.6 mols) of ethylene oxide, 276 grams (approximately 2.6 mols) of xylene and 0.6 gram of sodium hydroxide was reacted and treated as in Example 1. The maximum pressure developed during the reaction was 195 pounds per square inch.

The product thus obtained weighed 134 grams and was a clear, yellow-colored oil having the following characteristics:

|  | Observed | Calculated |
|---|---|---|
| Molecular weight | 628 | 664 |
| Hydroxyl value per cent | 11.1 | 10.3 |

*Example 4.—Hydroxybutenyl ether of dipentaerythritol (one butadiene monoxide per hydroxyl)*

A charge consisting of 102 grams (approximately 0.4 mol) of dipentaerythritol, 196 grams (approximately 2.8 mols) of butadiene monoxide, 296 grams (approximately 2.8 mols) of xylene and 0.3 gram of sodium metal were reacted and treated as in Example 1. The maximum pressure developed during the reaction was 85 pounds per square inch.

The product weighed 273 grams and was a clear reddish-brown-colored oil having the following characteristics:

|  | Observed | Calculated |
|---|---|---|
| Molecular weight | 1,866 | 674 |
| Hydroxyl value per cent | 15.1 | 14.1 |
| Viscosity (25° C.) poises | 388 |  |
| Iodine number | 230 | 226 |

From the observed molecular weight it appears that the product is a trimer of the expected ether.

In the foregoing examples the reactions were conducted under substantially anhydrous conditions of reaction. As hereinabove stated, it has been found that the presence of water favors the polymerization of the alkene oxide. Although some water may be present, the yield of the desired product may be substantially affected.

Although xylene was the inert liquid used in the foregoing examples, other inert organic solvents which dissolve both the alkene oxide and the desired hydroxy ethers but which do not dissolve substantial amounts of pentaerythritol or polypentaerythritols may be used. Such solvents are, for example, petroleum naphtha fractions, toluene and other aromatic hydrocarbons and the like. The inert solvents which are preferred are those which have low vapor pressures and low molecular weights. Xylene is a preferred solvent in this respect. The amount of solvent which is used should be sufficient to dissolve the alkene oxide and to provide control of the pressure to the desired extent. Normally amounts greater than an equimolecular proportion based on the weight of the alkene oxide need not be used.

In effecting the reaction the alkene oxide should preferably be used in considerable excess of the stoichiometrical amount. In this manner some control of the number of alkene oxide groups which enter into the formation of the product may be obtained. As shown in Examples 1 and 2, approximately 2 mols of alkene oxide react per hydroxyl group of dipentaerythritol when approximately 13 mols of alkene oxide are present for each mol of dipentaerythritol, whereas 4 mols of alkene oxide react per hydroxyl group when 25 mols of alkene oxide are present for each mol of dipentaerythritol.

Alkaline catalysts which may be used are sodium metal, sodium hydroxide (whose uses are illustrated in the examples), sodium methoxide, potassium hydroxide, and generally alkali metals, alkali-metal oxides and alkali-metal hydroxides. The proportion of catalyst in the reaction mixture is not critical and may be varied considerably. Only a small proportion, as illustrated in the examples, need be used. When acid catalysts or catalysts such as boric oxide, boric acid, boron fluoride, benzoyl chloride, acetic anhydride, or esters such as pentaerythritol diacetate are used, the product is apparently substantially a derivative in which not more than 1 alkene oxide is reacted per hydroxyl group of the polyhydric alcohol.

Although the reaction is applied hereinabove to the preparation of pentaerythritol and polypentaerythritol derivatives, it may be applied to other polyhydric alcohols having more than 3 hydroxyl radicals per molecule.

Derivatives of alkene oxides other than ethylene oxide, propylene oxide and butadiene monoxide may be prepared in similar manner, as is obvious. Such additional alkene oxides which may be used are butylene oxide, pentene oxides and aryl-substituted alkene oxides such as styrene epoxide.

The hydroxy ethers of the present invention are readily dehydrated to produce olefin ethers. Accordingly care must be exercised to control the reaction and prevent the temperature from rising to an extent such as to effect dehydration of the desired compound. It is for this reason that the compounds cannot be readily separated by distillation from any alkene oxide polymers that may be formed in the reaction. In conducting the reaction, if a product that is substantially free from alkene oxide polymers is required, it is desirable to observe all precautions specified herein in order that difficult separations of the desired products from the alkene oxide polymers may be avoided.

Although, as shown in the foregoing examples and comparative results, the products of my invention are apparently substantially free from polymers of alkene oxides and consist essentially of polyhydric alcohols in which each of the original hydroxyl radicals of the polyhydric alcohol has been replaced by a hydroxy ether radical containing at least 2 alkene oxide nuclei, such as the radicals —O—CH$_2$CH$_2$—O—CH$_2$CH$_2$OH, —O—CH$_2$CH(CH$_3$)—O—CH$_2$CH(CH$_3$)—O—CH$_2$CHOH—CH$_3$ and the like, it is to be understood that the invention is not to be thus restricted. The products of my invention are novel and may have compositions and constitutions which are quite different from those referred to herein. Accordingly, because of the difficulty in separation, isolation and identification of such products or individual components thereof, the specification and the claims are to be interpreted in the light of these facts, that is, the claims are to be given the broadest interpretation of which they are capable and compounds which are referred to herein as having a presumed constitution, formula or composition are to be regarded as having such other composition, constitution or formula as they actually possess.

The hydroxy ethers of the present invention are useful as solvents and plasticizers for various plastic organic substances such as zein and others characterized by a plurality of C—O—C linkages, such as cellulose ethers, cellulose nitrate, cellulose acetate, polyvinyl alcohols, polyvinyl acetals, phenol-aldehyde resins, urea-formaldehyde resins and the like. They generally possess hydrophilic properties and are useful as emulsifying agents, wetting agents, interface-modifying agents and may be used as antispattering agents for oleaginous and fatty materials. These hydroxy ethers may also be used for the breaking of petroleum-water emulsions. As plasticizing agents for plastic substances they exhibit properties similar to the hydroxy ethers disclosed in the copending applications of Philip I. Bowman, Robert H. Barth and Harry Burrell, Serial No. 474,328, filed February 1, 1943 (Patent No. 2,401,743), and Serial No. 545,888, filed July 20, 1944.

Inasmuch as the foregoing specification comprises preferred embodiments of my invention, it is to be understood that the invention is not limited thereto and that modifications and variations may be made therein without departing substantially from the invention, whose scope is to be limited solely by the appended claims.

I claim:

1. A process for the production of a hydroxy ether by the condensation of ethylene oxide and pentaerythritol, which hydroxy ether is the compound resulting from the condensation of at least eight and not more than sixteen molecular proportions of ethylene oxide with each molecular proportion of pentaerythritol, which comprises heating pentaerythritol with a stoichiometrical excess of ethylene oxide reactive to form said compound at a superatmospheric pressure under essentially anhydrous reaction conditions in the presence of a strongly alkaline catalyst selected from the group consisting of alkali metals and alkali-metal oxides and hydroxides, and in the presence of an inert common solvent for ethylene oxide and said compound but in which pentaerythritol is substantially insoluble.

2. A process for the production of a hydroxy ether by the condensation of propylene oxide and pentaerythritol, which hydroxy ether is the compound resulting from the condensation of at least eight and not more than sixteen molecular proportions of propylene oxide with each molecular proportion of pentaerythritol, which comprises heating pentaerythritol with a stoichiometrical excess of propylene oxide reactive to form said compound at a superatmospheric pressure under essentially anhydrous reaction conditions in the presence of a strongly alkaline catalyst selected from the group consisting of alkali metals and alkali-metal oxides and hydroxides, and in the presence of an inert common solvent for ethylene oxide and said compound but in which pentaerythritol is substantially insoluble.

3. A process for the production of a hydroxy ether by the condensation of propylene oxide and dipentaerythritol, which hydroxy ether is the compound resulting from the condensation of at least twelve and not more than twenty-four molecular proportions of propylene oxide with each molecular proportion of dipentaerythritol, which comprises heating dipentaerythritol with a stoichiometrical excess of propylene oxide reactive to form said compound at a superatmospheric pressure under essentially anhydrous reaction conditions in the presence of a strongly alkaline catalyst selected from the group consisting of alkali metals and alkali-metal oxides and hydroxides, and in the presence of an inert common solvent for ethylene oxide and said compound but in which dipentaerythritol is substantially insoluble.

4. A process for the production of a hydroxy ether by the condensation of an alkene oxide and a polyhydric alcohol selected from the group consisting of pentaerythritol and dipentaerythritols, which hydroxy ether is the compound resulting from the condensation of at least two and not more than four molecular proportions of the alkene oxide to each molecular proportion of hydroxyl radical present originally in the polyhydric alcohol, which comprises heating the polyhydric alcohol at a superatmospheric pressure under substantially anhydrous reaction conditions with a stoichiometrical excess of the alkene oxide reaction to form said compound dissolved in an inert solvent in which pentaerythritol and polypentaerythritols are substantially insoluble in the presence of a strongly alkaline catalyst selected from the group consisting of alkali metals and alkali-metal oxides and hydroxides.

5. An ether-alcohol consisting of a condensation product of an alkene oxide and an alcohol selected from the group consisting of pentaerythritol and polypentaerythritols in which each of the hydroxyl radicals originally present in the alcohol has been replaced by a radical formed by the condensation of at least two but not more than four alkene oxide molecules, said condensation being carried out in the presence of a solvent in which pentaerythritol and polypentaerythritols are substantially insoluble, and in the presence of a strongly alkaline catalyst under essentially anhydrous reaction conditions.

6. A process for the production of a hydroxy ether by the condensation of an alkene oxide and a polyhydric alcohol selected from the group consisting of pentaerythritol and dipentaerythritols, which hydroxy ether is the compound resulting from the condensation of at least two and not more than four molecular proportions of the alkene oxide to each molecular proportion of hydroxyl present originally in the polyhydric alcohol which comprises heating the polyhydric alcohol at a superatmospheric pressure under substantially anhydrous reaction conditions with the stoichiometrical excess of the alkene oxide reactive to form said compound, said alkene oxide being dissolved in an inert common solvent for the alkene oxide and said compound but in which pentaerythritol is substantially insoluble, and in the presence of a strongly alkaline catalyst.

7. A process for the production of a hydroxy ether by the condensation of an alkene oxide and a polyhydric alcohol selected from the group consisting of pentaerythritol and polypentaerythritols, which hydroxy ether is the compound resulting from the condensation of at least two and not more than four molecular proportions of the alkene oxide to each molecular proportion of hydroxyl present originally in the polyhydric alcohol, which comprises heating the polyhydric alcohol at a superatmospheric pressure under substantially anhydrous reaction conditions with the stoichiometrical excess of alkene oxide reactive to form such compound, said alkene oxide being dissolved in xylene, and in the presence of a strongly alkaline catalyst.

HERMAN SOKOL.

REFERENCES CITED

The following references are of record in the file of this patent:

UNITED STATES PATENTS

| Number | Name | Date |
|---|---|---|
| 1,971,662 | Schmidt | Aug. 28, 1934 |
| 2,069,336 | Schmidt | Feb. 2, 1937 |
| 2,094,100 | Dreyfus | Sept. 28, 1937 |
| 2,174,761 | Schuette | Oct. 3, 1939 |
| 2,228,929 | Reibnitz | Jan. 14, 1941 |
| 2,253,723 | Moore | Aug. 26, 1941 |
| 2,327,053 | Marple | Aug. 17, 1943 |
| 2,355,823 | Schlegel | Aug. 15, 1944 |

FOREIGN PATENTS

| Number | Country | Date |
|---|---|---|
| 317,770 | Great Britain | Aug. 19, 1924 |
| 605,973 | Germany | Nov. 22, 1934 |